Figure 1:
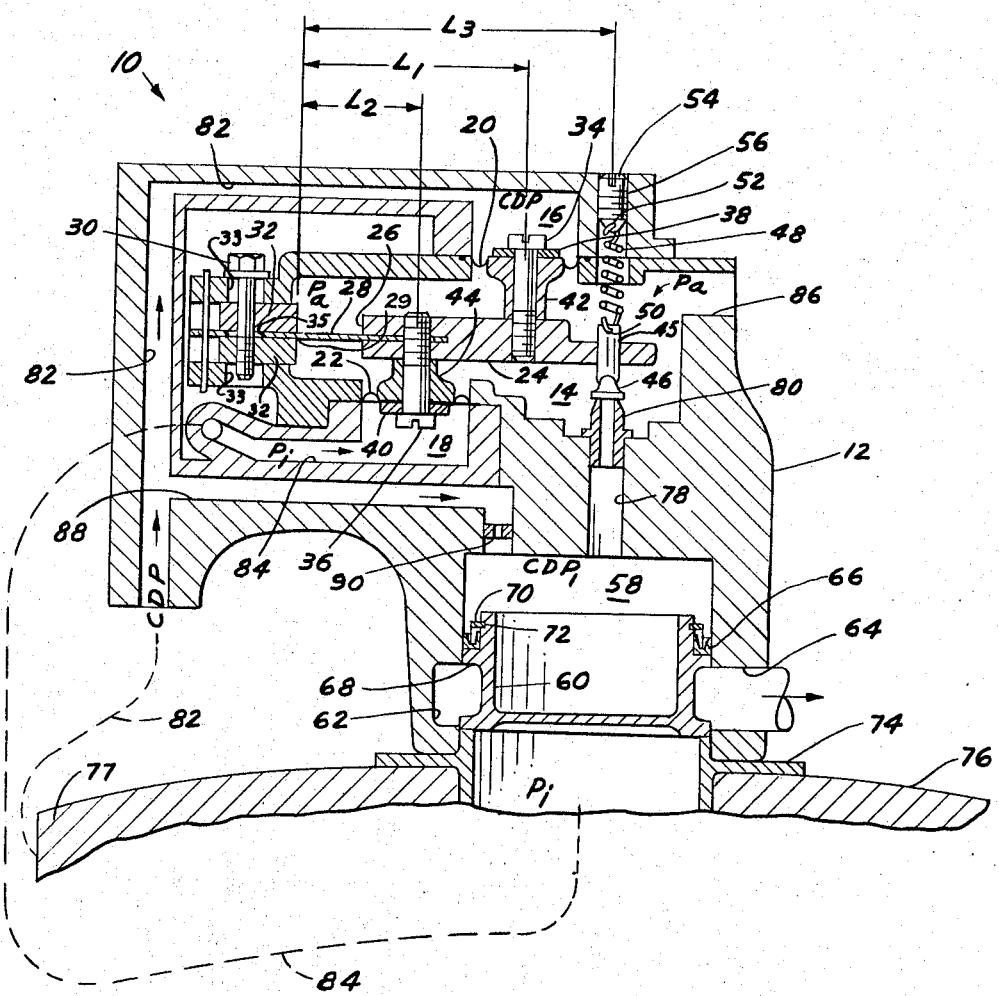

Jan. 17, 1967   P. F. LIKAVEC   3,298,600
PRESSURE REGULATOR
Filed March 25, 1964   2 Sheets-Sheet 1

INVENTOR
PAUL F. LIKAVEC

BY Walter Patnuka, Jr.

ATTORNEY

INVENTOR
PAUL F. LIKAVEC

BY Walter Potnick, Jr.
ATTORNEY

United States Patent Office 3,298,600
Patented Jan. 17, 1967

3,298,600
PRESSURE REGULATOR
Paul F. Likavec, Detroit, Mich., assignor to Holley Carburetor Company, Warren, Mich., a corporation of Michigan
Filed Mar. 25, 1964, Ser. No. 354,725
16 Claims. (Cl. 230—114)

This invention relates generally to pressure regulators, and more particularly to gas turbine engine compressor bleed controls.

Compressor bleed controls used in the past have been primarily of the so-called snap-action type. In other words, they "snapped" from the fully open to the fully closed position, and vice versa, once the stall region was passed, over a relatively small range of compressor pressure ratio, the latter term being defined as the ratio of compressor discharge pressure (CDP) to compressor inlet pressure ($P_a$). Such fast action is not satisfactory in many applications, such as in gas turbine engines used on helicopters or in any other multi-speed engines wherein the bleeding beyond the stall range must be controlled over a somewhat longer predetermined compressor pressure ratio range in order to assure stability and proper control of the helicopter or other unit, particularly during some transition-speed range wherein sudden undesirable surges or thrusts must be avoided.

Electrically triggered pneumatic devices have been suggested to solve the above problem, but these have proven to be rather expensive and obviously less able to remain continuously reliable due to the incorporation of an additional electrical system which must be operative at all times.

Accordingly, a primary object of the invention is to provide a simple and efficient pneumatic compressor bleed control mechanism, wherein the bleed valve and control system are integral.

Another object of the invention is to provide such a device wherein the bleeding takes place over a controlled compressor pressure ratio range.

A more specific object of the invention is to provide such a device wherein a servo pressure is obtained by diverting the compressor discharge pressure across a fixed restriction in a branch passageway and into a chamber having one side thereof formed by a piston located adjacent the particular compressor stage being bled. The servo pressure thus obtained in the chamber is controlled over a predetermined range by a poppet type servo valve whose opening is determined by a pneumatic computing section. The piston is caused to move by a change in the regulated servo pressure to progressively control the amount of interstage pressure being bled off past the other side of the piston.

Still another object of the invention is to provide such a device which may be easily and quickly adjusted during assembly for use on a particular engine or for different engine applications.

Figure 4:
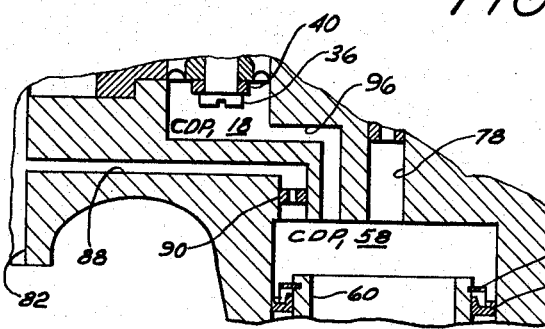
Figure 2:
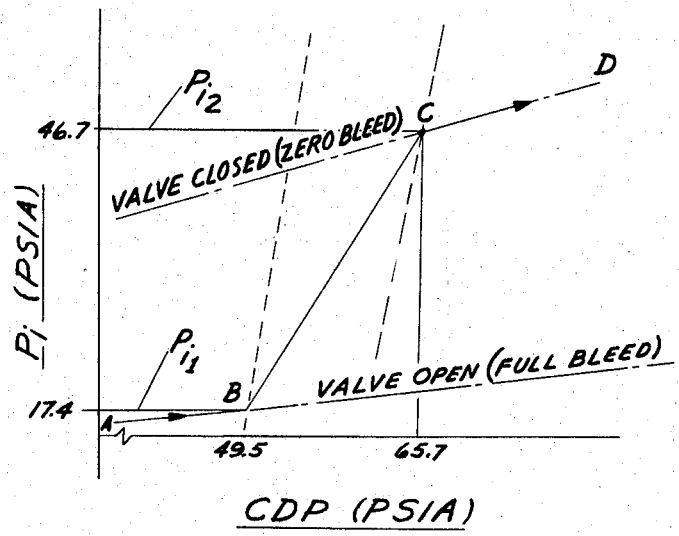
Figure 3:
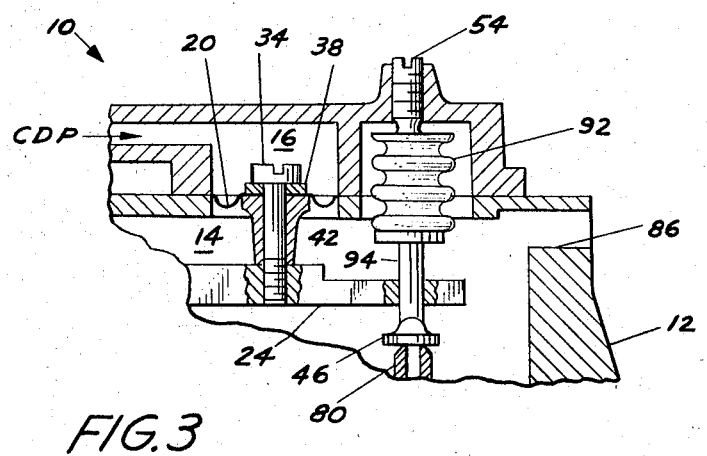

Other more specific objects and advantages of the invention will become more apparent when reference is made to the following specification and illustrations wherein:

FIGURE 1 is a schematic illustration of the invention;
FIGURE 2 is a graph of Interstage Pressure vs. Compressor Discharge Pressure at sea level conditions illustrative of the operation of the invention;
FIGURE 3 is a fragmentary cross-sectional view illustrating a modification of the invention;
FIGURE 4 is a fragmentary cross-sectional view illustrating a further modification of the invention.

Referring now to FIGURE 1 in greater detail, the pressure regulator 10 includes a housing 12 containing a main central chamber 14. Two additional chambers 16 and 18 may be formed in recesses in the walls of the central chamber 14. Diaphragms 20 and 22 form movable walls between the chamber 16 and the central chamber 14 and between the chamber 18 and the central chamber 14, respectively. A lever 24 is pivotally connected at its one end 26 to a wall of the central chamber 14 by means of a pivot strip 28, and may include suitable means for adjusting the location of the pivot point 29, as by sliding a screw 30 and spacers 32 within the slots 33 and 35. The diaphragms 20 and 22 are rigidly connected at different points along the lever 24 by means of screws 34 and 36, diaphragm washers 38 and 40, and flanged spacers 42 and 44, respectively. A poppet servo valve 46 is operatively connected to a third point along the lever 24. A tension spring 48 is connected at its one end through a hole 50 formed in the end of the member 45 contacting valve 46 and at its other end through a hole 52 formed in a manually adjustable screw 54. The latter is inserted into a threaded opening 56 in the wall of the housing.

An additional chamber 58, hereinafter called a servo chamber, having a piston 60 slidably mounted therein may be included as an integral part of the housing 12. The servo chamber 58 may include an annular cavity 62 surrounding the piston 60, the cavity 62 including an outlet 64 to the atmosphere. A suitable seal ring 66 may be located between the outer periphery of the piston 60 and the wall of the servo chamber and confined axially between a flange 68 formed on the piston 60 and a retainer member 70 located in a groove 72 formed around the piston 60. The pressure regulator 10 may further include a flange 74 for mounting the housing 12 against the wall of some particular stage of a gas turbine engine compressor, represented generally as 76.

A passageway 78 communicates between the central chamber 14 and the servo chamber 58. A valve seat 80 is located adjacent the servo valve 46 in the juncture between the passageway 78 and the central chamber 14. A conduit 82 communicates between the outlet 77 of the compressor 76 and the chamber 16. A second conduit 84 communicates between the selected stage of the compressor 76 and the chamber 18. The central chamber 14 is exposed to the atmosphere by means of an opening 86 through the wall thereof. A third passageway 88, which may branch off the conduit 82, communicates between the discharge end 77 of the compressor 76 and the servo chamber 58, and it includes a fixed restriction 90.

OPERATION

Turbine engines, regardless of whether they employ a single spool compressor or a split spool compressor, frequently encounter the problem of compressor stall. This characteristic occurs because the various stages of the compressor, as a unit, can operate at maximum efficiency at one particular compressor speed. At speeds lower than design speed, the various stages are not correctly matched to handle the total air flow. The tendency of the first stages to supply more air than subsequent stages can accommodate results in a stall of certain compressor stages and causes surging air flow and pulsations of pressure. If allowed to continue, the resultant engine vibrations can lead to damage to the compressor. This problem is overcome, as previously indicated, by the provision of a suitable pressure regulator 10 which serves to bleed off a selected stage of the compressor 76. The gain in compressor performance more than compensates for the loss of work done in compressing the air which is being bled off.

Referring now to FIGURE 1, it may be noted that compressor discharge air at a pressure CDP is fed into the chamber 16 via the conduit 82 and also into the branch passageway 88. CDP drops across the fixed restriction 90, resulting in a somewhat lower pressure $CDP_1$ in the servo chamber 58. Air at a pressure $P_i$ from a selected stage of the compressor 76 is communicated via the conduit 84 to the chamber 18. This interstage pressure $P_i$ is also present on the compressor side of the piston 60, opposite the servo chamber 58. Ambient air at a pressure $P_a$ is directed to the central chamber 14 through the opening 86 in the wall of the housing 12.

The pressure differentials $CDP-P_a$ and $P_i-P_a$ act upon the lever 24 through their effect on the diaphragms 20 and 22, which are secured to the lever 24 by means of the flanged spacers 42 and 44 and screws 34 and 36. The effect of these pressures, CDP and $P_i$, on the lever 24 is to pivot it about the anchor point 29 of the pivot strip 28. This pivotable motion, in turn, varies the opening between the poppet valve 46 on the free end of the lever 24 and the fixed valve seat 80.

It is obvious that, with the valve 46 closed, the pressure $CDP_1$ in the servo chamber 58 approaches the value of CDP. However, with the poppet valve 46 open, air will flow from the servo chamber 58 through the passageway 78 into the central chamber 14, reducing the pressure $CDP_1$ in the chamber 58 to a value slightly greater than the ambient air pressure $P_a$.

The specific purpose of controlling the movement of the lever 24 in response to change in pressure CDP and $P_i$ is to set the poppet valve 46 opening such that the generated pressure $CDP_1$, as a function of CDP, is substantially equal to pressure $P_i$ over the transition range of lines B-C of FIGURE 2, less than $P_i$ during the "valve open" range A-B and greater than $P_i$ during the "valve closed" range C-D. The areas of the piston 60, which are exposed to pressure $CDP_1$ on the one side thereof and to pressure $P_i$ on the other side thereof, are substantially equal in the preferred embodiment shown by FIGURE 1. The piston 60 will thus seek a position of equilibrium throughout the transition range B-C, allowing the proper amount of interstage air to be bled off past the compressor side of the piston 60, into the annulus 62 and through outlet 64, to the atmosphere, thereby maintaining the relationship, $P_i = CDP_1$.

The setting of the poppet valve 46 opening so as to produce the sloped transition effect B-C (FIGURE 2) is accomplished through the use of a feedback system. Referring again to FIGURE 1, it may be noted that, if the feedback diaphragm 22 and the chamber 18 were not included in the computing section, once the force of the spring 48 is overcome by a sufficiently high CDP pressure in the chamber 16, the valve 46, being operatively connected to the lever 24 and to the spring 48, would close against the valve seat 80 causing the piston 60 to move suddenly so as to completely close off the outlet 64.

Now, let us consider the effect of having the feedback diaphragm 22 and the chamber 18 incorporated in the system. As CDP in the passageways 82 and 88 increases, so also does $CDP_1$ in the chamber 58, mainly due to the reduced opening 46/80 due to the downward movement of the valve 46 caused by the increased force on the diaphragm 20. The increased $CDP_1$ tends to move the piston 60 downwardly, thereby increasing the pressure $P_i$ by virtue of the fact that less $P_i$ would be bled off through the outlet port 64. The increase in pressure $P_i$ is fed back to the chamber 18 via the conduit 84 and would thus act, through the diaphragm 22, as a counterforce to the effect of CDP on the diaphragm 20. This would reduce the travel of the valve 46 toward the valve seat 80, allowing additional $CDP_1$ to bleed off through the opening 46/80, thereby tending to continually bring $CDP_1$ into equilibrium with $P_i$, until such time as the piston 60 finally closes off the outlet 64, as represented by point C of FIGURE 2.

The over-all effect is an upwardly sloped transition line, similar to line B-C, over a controlled compressor pressure ratio range, rather than at some particular compressor pressure ratio or over a much smaller range. With a decrease in CDP, and hence in $CDP_1$ in the chamber 58, the reverse effect would be true, i.e., a downward transition along the line C-B.

For purposes of better illustrating the operation of the pressure regulator 10, refer again to FIGURE 2. For a particular compressor 76, it could, for example, be desirable to regulate the interstage pressure $P_i$ in accordance with the values illustrated in FIGURE 2, namely, full bleed up to 49.5 p.s.i.a. CDP and zero bleed after 65.7 p.s.i.a. CDP. The desired relationship between $P_i$ and CDP would, therefore, be in accordance with the solid line curve ABCD.

The resultant pressure ratios at the selected points, B and C, would be as follows:

(1) $\quad P_{i1}/CDP_B = 17.4/49.5 = 0.352$
(2) $\quad P_{i2}/CDP_C = 46.7/65.7 = 0.711$ As indicated above, the generated pressure $CDP_1$ on the servo side of the piston 60 would also satisfy the conditions in Equations 1 and 2. Naturally, the various components of the regulator 10 must be related in such a way as to fulfill the above requirements. One such satisfactory relationship is to have the areas of the diaphragm 20 and the diaphragms 22, $A_{20}$ and $A_{22}$, respectively, both equal to 0.31 in.$^2$; the lengths $L_1$, $L_2$ and $L_3$ equal to 3.0″, 1.3″ and 2.3″, respectively; the effective area of the poppet valve 46, $A_{46}$, equal to 0.014 in.$^2$ and the rate of the spring 48, $K_{48}$, equal to 100 lbs./in.

Now it can be determined that the travel of poppet valve 46, which would be necessary to satisfy the conditions of Equations 1 and 2, is 0.00926 inch. Then the change in spring load $\Delta F_s = 100 \times 0.00926 = 0.926$ lb., in accordance with the well known formula $F_s = K_s X$, wherein X equals the length of the spring travel.

The equation of equilibrium on the lever 24 may be written as $$(CDP - P_a)A_{20}L_1 - (P_i - P_a)A_{22}L_2 \\ -F_sL_3 - (CDP_1 - P_a)A_{46}L_3 = 0$$

Substituting for conditions at point B in FIGURE 2 for $P_a = 14.7$ p.s.i.a.

$34.8(0.31)(3) - 2.7(0.31)(1.3) - 2.5F_{s1} - 2.7(0.014)(2.3) = 0$
$32.4 \qquad -1.1 \qquad -2.5F_{s1} - .1 \qquad = 0$ $F_{s1} = 12.476$ lbs.

Substituting for conditions at point C, $51(0.31)(3) - 32(0.31)(1.3) - 2.5F_{s2} - 32(0.014)(2.3) = 0$
$47.4 \qquad -12.9 \qquad -2.5F_{s2} - 1.0 \qquad = 0$ $F_{s2} = 13.402$ lbs.

Hence, $\Delta F_s = F_{s2} - F_{s1} = 13.402 - 12.476 = 0.926$ lb., which verifies the value previously mentioned as being necessary to satisfy the conditions of Equations 1 and 2.

It may be noted that, in the above described system 10, adjustment of the system for different engine applications has been provided for by means of the manually adjustable screw 54 operatively connected to the spring 48 and by means of the adjustable pivot point 29. If adjustment of the system were not of primary importance, the spring 48 could be omitted from the system 10 and the valve 46 would function properly in response to the fluid pressure forces acting thereon, provided that other design factors are suitably selected. Besides providing for adjustment, the spring 48 in the system adds rigidity thereto, in that there are now two forces working in the same direction, opposing the CDP force.

As illustrated in the modification of FIGURE 3, wherein those components which are the same as those of FIGURE 1 bear the same reference numerals, an evacuated bellows 92 may be substituted for the spring 48. The bellows 92 is fixedly attached at its one end to the adjustment screw 54 threadedly inserted in a wall of the housing 12 and at its other end to a flanged valve member 94. The member 94 is secured to the lever 24 and must include the previously mentioned poppet servo valve 46 formed at the bottom end thereof, whether or not the valve 46 is actually attached to member 94.

The practical effect of using a bellows in lieu of a spring is that the bellows permits the pressure regulator 10 to be used in aircraft applications, wherein the ambient pressure varies with altitude.

In this modification, $P_i$ pressure may be bled off so as to maintain a desired pressure ratio, $CDP/P_i$, during a predetermined range of over-all compressor pressure ratio, $CDP/P_a$. When the ratio $CDP/P_a$ is below the required value, the piston 60 will be fully open and when the ratio is above the required value, the piston will be fully closed.

Additionally, the spring 48, as used in FIGURE 1, always acts upwardly. The bellows 92 is compressed in FIGURE 3, thereby providing, in addition to an inherent downward spring force, a resultant upward force due to the fact that the bellows is evacuated. This provides rigidity and permits the use of a smaller, more practical feedback diaphragm 22 and a shorter more easily packaged lever 24.

While the system 10, as illustrated in FIGURE 1, uses the selected interstage pressure, $P_i$, in the feedback chamber 18, since the regulator 10 normally schedules $CDP_1$ substantially equal to $P_i$ while the piston 60 is varying from fully open to fully closed, the feedback chamber 18, could, if desired and as illustrated in FIGURE 4, be subjected to $CDP_1$ through a passageway 96 communicating between the chamber 18 and chamber 58, the latter passageway 96 being used in lieu of the branch passageway 84. However, as a practical matter, $CDP_1$ will never equal CDP, since the poppet servo valve 46 would not completely close as it does when the actual engine interstage pressure $P_i$ is being fed to the feedback chamber 18. In other words, the slope of line C–D of FIGURE 2 would be shifted. The pressure $CDP_1$ would still be somewhat greater than the amount represented by line C–D in FIGURE 2, but it would be greater by a different amount than in the case where interstage pressure $P_i$ is used.

It should now be apparent that a novel compressor bleed control has been provided which may be readily adjusted for different engine applications and during assembly.

It should be further apparent that the control performs a bleeding function over a predetermined relatively long compressor pressure ratio range, thereby providing the stability and control required by helicopters and other multi-speed engines.

While but two modifications of the invention have been diclosed and described, it is apparent that other modifications of the invention are possible within the scope of the appended claims.

What I claim as my invention is:

1. In a gas turbine engine compressor, a pressure regulator, comprising a computing section, a conduit communicating between said computing section and a stage of said compressor, a servo chamber, a conduit including a restriction therein communicating between the outlet of said compressor and said servo chamber, a servo valve for at times communicating between said servo chamber and said computing section, a lever pivotally mounted at its one end in said computing section and having said servo valve operatively connected intermediate the ends thereof, a piston forming a movable wall between said servo chamber and said stage of said compressor, means for pivoting said lever in response to changes in compressor discharge pressure and presure within said stage, and an opening to the atmosphere from said stage, said opening being controlled by movement of said piston therepast.

2. In a gas turbine engine compressor, a pressure regulator, comprising a computing section, a conduit communicating between said computing section and a stage of said compressor, a servo chamber, a conduit including a restriction therein communicating between the outlet of said compressor and said servo chamber, a servo valve for at times communicating between said servo chamber and said computing section, a lever pivotally mounted at its one end in said computing section and having said servo valve operatively connected intermediate the ends thereof, a piston forming a movable wall between said servo chamber and said stage of said compressor, a pair of pressure responsive means secured to said lever, said pair of pressure responsive means being responsive to changes in compressor discharge pressure and pressure within said stage, repectively, and an opening to the atmosphere from said stage, said opening being controlled by movement of said piston therepast.

3. In a gas turbine engine compressor, a pressure regulator, comprising a computing section, a conduit communicating between said computing section and a stage of said compressor, a servo chamber, a conduit including a restriction therein communicating between the outlet of said compressor and said servo chamber, a servo valve for at times communicating between said servo chamber and said computing section, a lever pivotally mounted at its one end in said computing section and having said servo valve operatively connected intermediate the ends thereof, a piston forming a movable wall between said servo chamber and said stage of said compressor, three pressure responsive means secured to said lever, said three pressure reponsive means being responsive to changes in compressor discharge pressure, pressure within said stage, and ambient pressure, respectively, and an opening to the atmosphere from said stage, said opening being controlled by movement of said piston therepast.

4. The device as described in claim 3, wherein one of said three pressure responsive means is manually adjustable.

5. In a compressor of a gas turbine engine, a pressure regulator, comprising a housing including a first central chamber, second and third chambers adjacent said first chamber, first and second pressure responsive devices forming movable walls between said first and second chambers and between said first and third chambers, respectively, a lever in said central chamber having one end thereof pivotally attached to a wall of said central chamber, a first rigid member connecting said first pressure responsive device to said lever at a fixed distance from said pivot point, a second rigid member connecting said second pressure responsive device to said lever at a second fixed distance from said pivot point, resilient means having one end thereof mounted on a wall of said first chamber and the other end thereof fixedly attached to said lever at a third point along said lever, a servo valve operatively connected to said lever at said third point, a first conduit communicating between the outlet of said compressor and said third chamber, a second conduit communicating between an intermediate stage of said compressor and said second chamber, an opening in said first chamber for exposing said first chamber to ambient pressure, a fourth chamber formed in said housing, a fifth chamber in said housing in communication with said intermediate stage, a piston slidably mounted between said fourth and fifth chambers, a third conduit communicating between the outlet of said compressor and said fourth chamber, a fixed restriction in said third conduit, and a bleed outlet from said fifth chamber, said bleed outlet being progressively opened and closed by said piston.

6. The device as described in claim 5, wherein said resilient means is manually adjustable.

7. The device as described in claim 5, wherein said pivotally attached end is manually adjustable.

8. In a compressor of a gas turbine engine, a pressure regulator, comprising a housing including a first central chamber, second and third chambers adjacent said first chamber, first and second pressure responsive devices forming movable walls between said first and second chambers and between said first and third chambers, respectively, a lever in said central chamber having one end thereof pivotally attached to a wall of said central chamber, a first rigid member connecting said first pressure responsive device to said lever at a fixed distance from said pivot point, a second rigid member connecting said second pressure responsive device to said lever at a second fixed distance from said pivot point, pressure responsive means having one end thereof mounted on a wall of said first chamber and the other end thereof fixedly attached to said lever at a third point along said lever, a servo valve operatively connected to said lever at said third point, a first conduit communicating between the outlet of said compressor and said third chamber, a second conduit communicating between an intermediate stage of said compressor and said second chamber, an opening in said first chamber for exposing said first chamber to ambient pressure, a fourth chamber formed in said housing, a fifth chamber in said housing in communication with said intermediate stage, a piston slidably mounted between said fourth and fifth chambers, a third conduit communicating between the outlet of said compressor and said fourth chamber, a fixed restriction in said third conduit, and a bleed outlet from said fifth chamber, said bleed outlet being progressively opened and closed by said piston.

9. The device as described in claim 8, wherein said pressure responsive means is manually adjustable.

10. The device as described in claim 8, wherein said pivotally attached end is manually adjustable.

11. In a gas turbine engine compressor including a plurality of stages therein, a pressure regulator, comprising a computing section, a servo chamber, a conduit communicating between said computing section and said servo chamber, a conduit including a restriction therein communicating between the outlet of said compressor and said servo chamber, a servo valve for at times communicating between said servo chamber and said computing section, a lever pivotally mounted at its one end in said computing section and having said servo valve operatively connected intermediate the ends thereof, a piston forming a movable wall between said servo chamber and one of said stages of said compressor, a pair of pressure responsive means secured to said lever, said pair of pressure responsive means being responsive to changes in compressor discharge pressure and pressure within said servo chamber, respectively, and an opening to the atmosphere from said one of said stages, said opening being controlled by movement of said piston therepast.

12. In a gas turbine engine compressor including a plurality of stages therein, a pressure regulator, comprising a computing section, a servo chamber, a conduit communicating between said computing section and said servo chamber, a conduit including a restriction therein communicating between the outlet of said compressor and said servo chamber, a servo valve for at times communicating between said servo chamber and said computing section, a lever pivotally mounted at its one end in said computing section and having said servo valve operatively connected intermediate the ends thereof, a piston forming a movable wall between said servo chamber and one of said stages of said compressor, three pressure responsive means secured to said lever, said three pressure responsive means being responsive to changes in compressor discharge pressure, pressure within said servo chamber, and ambient pressure, respectively, and an opening to the atmosphere from said one of said stages, said opening being controlled by movement of said piston therepast.

13. A pressure regulator comprising means for providing and controlling a servo pressure as a function of a selected pressure, said means including lever means and pressure responsive means operatively connected to said lever means for movement therewith, said pressure responsive means being responsive to changes in said selected pressure and said servo pressure, and means for controlling a selected lesser pressure in direct proportion to said servo pressure over a predetermined range of said selected pressure by bleeding off said selected lesser pressure.

14. A regulator as described in claim 13, wherein the pressure responsive means is a pair of diaphragms.

15. A regulator as described in claim 13, wherein said pressure responsive means is responsive additionally to said selected lesser pressure.

16. A pressure regulator comprising means for providing and controlling a servo pressure as a function of a selected pressure, and means for controlling a selected lesser pressure in direct proportion to said servo pressure over a predetermined range of said selected pressure by bleeding off said selected lesser pressure, said first mentioned means including pressure responsive means, lever means fixedly secured to said pressure responsive means, and valve means fixedly secured to said lever means, said lever means being movable in response to changes in at least one of said plurality of pressures.

References Cited by the Examiner
UNITED STATES PATENTS

| | | | |
|---|---|---|---|
| 2,602,350 | 7/1952 | Marcellus | 74—522 |
| 2,732,125 | 1/1956 | Ruby | 230—115 |
| 2,837,269 | 6/1958 | Torell | 230—114 |
| 2,863,601 | 12/1958 | Torell | 230—114 |
| 2,886,968 | 5/1959 | Johnson | 230—114 |
| 2,930,520 | 3/1960 | Abild | 230—114 |
| 2,958,457 | 11/1960 | Fox | 230—115 |
| 2,978,166 | 4/1961 | Hahn | 230—115 |
| 3,092,128 | 6/1963 | Pembleton | 230—114 |
| 3,176,540 | 4/1965 | Davis | 74—522 |

LAURENCE V. EFNER, *Primary Examiner.*